United States Patent
Vignotto et al.

(10) Patent No.: US 6,899,463 B2
(45) Date of Patent: May 31, 2005

(54) PROTECTION DEVICE FOR AN ENCODER IN A ROLLING BEARING

(75) Inventors: Angelo Vignotto, Turin (IT); Massimo Russo, Turin (IT)

(73) Assignee: SKF Industrie S.p.A., Turin (IT)

( * ) Notice: Subject to any disclaimer, the term of this patent is extended or adjusted under 35 U.S.C. 154(b) by 133 days.

(21) Appl. No.: 10/336,194

(22) Filed: Jan. 3, 2003

(65) Prior Publication Data

US 2003/0138175 A1 Jul. 24, 2003

(30) Foreign Application Priority Data

Jan. 18, 2002 (IT) .................................. TO2002A000053

(51) Int. Cl.[7] .............................................. F16C 19/18
(52) U.S. Cl. ....................................................... 384/448
(58) Field of Search ................................. 384/448, 544, 384/446; 374/174, 173

(56) References Cited

U.S. PATENT DOCUMENTS

| | | |
|---|---|---|
| 5,431,413 A | 7/1995 | Hajzler |
| 6,702,470 B2 * | 3/2004 | Beauprez .................... 384/448 |
| 2002/0126926 A1 | 9/2002 | Ohtsuki et al. |
| 2002/0181813 A1 * | 12/2002 | Beauprez .................... 384/448 |
| 2003/0031391 A1 * | 2/2003 | Vignatto et al. ............ 384/448 |

FOREIGN PATENT DOCUMENTS

| | | |
|---|---|---|
| EP | 0 737 821 A1 | 10/1996 |
| WO | WO 00/53942 | 9/2000 |
| WO | WO 00/54059 | 9/2000 |

* cited by examiner

*Primary Examiner*—Lenard A. Footland
(74) *Attorney, Agent, or Firm*—Merchant & Gould, P.C.

(57) ABSTRACT

Protection device (1) for an encoder (2) in a rolling bearing (3) presenting an outer race (5) which is arranged in contact against a fixed support (6), the device being interposed between the encoder (2) itself and a reading sensor (17) which is supported by the support (6) itself, and being provided with: a fixing race (18) which is shrink fit onto the outer race (5) of the bearing (3) and frontally to a shoulder (15) of the support (6); a protection shield (19) which extends from the fixing race (18) towards an inner race (4) of the bearing (3) in a position which is frontal to both the encoder (2) and the sensor (17); and a sealing element (30), which is integral to the fixing race (18) and the shoulder (15) for the static waterproofing of the support (6).

7 Claims, 1 Drawing Sheet

PROTECTION DEVICE FOR AN ENCODER IN A ROLLING BEARING

DESCRIPTION

Figure 3:
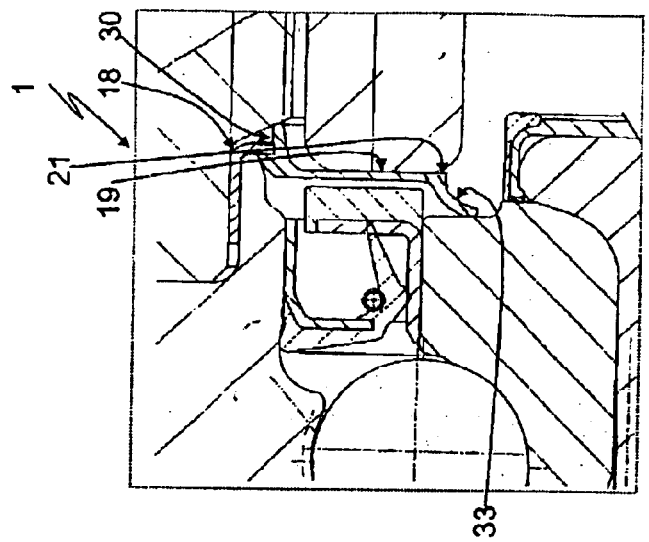

The present invention refers to a protection device for an encoder in a rolling bearing.

Rolling bearings of a well-known type are mounted onto a fixed support, and they present an inner rotating race, a fixed outer race which is coupled to the support and an encoder which is shrink fit onto the inner race and which faces towards the outside of the bearing itself. Usually, for the protection of the encoder and in an intermediate position between the encoder itself and a reading sensor which is also supported by the support, a protection device is positioned which comprises, in its most well-known general form of embodiment, a fixing race which is shrink fit onto the outer race of the bearing, and a protection shield which is make of rubber material and which extends from the fixing race towards the inner race of the bearing in a position which is frontal to the encoder.

The fixing race is provided with a cylindrical wall which is inserted between an outer cylindrical surface of the outer race of the bearing and an inner cylindrical surface of the support, and is also provided with an annular wall which faces a shoulder of the support, and this type of assembly should in theory prevent any detritus from being inserted between the parts which come into contact with each other during functional operation, and especially between the parts of the bearing and the support which are in contact with each other. Despite the fact, however, that some of the parts are arranged in direct contact with each other in order to define extremely precise positions between the parts in question themselves, the possibility, however minimal, still remains that some detritus may infiltrate between the parts themselves, to the detriment, in the long term, of the precision of the positions of the parts themselves.

The aim of the present invention is to produce a protection device for an encoder in a rolling bearing, which, all conditions pertaining to cost and production being equal, permits an improved static seal in comparison to that which is present in the kinds of devices which have just been described.

According to the present invention, a protection device for an encoder in a rolling bearing will be produced, presenting an outer race which is arranged in contact against a fixed support, the device being interposed between the encoder itself and a reading sensor which is supported by the support itself, and comprised a fixing race which is shrink fit onto the outer race of the bearing and which is frontal to a shoulder of the support, and a protection shield which extends from the fixing race towards an inner race of the bearing in a position which is frontal to both the encoder and the sensor; the device being characterised by the fact that it comprises a sealing element which is integral to the fixing race and which is interposed directly between the fixing race and the support in order to statically waterproof the support.

Figure 2:
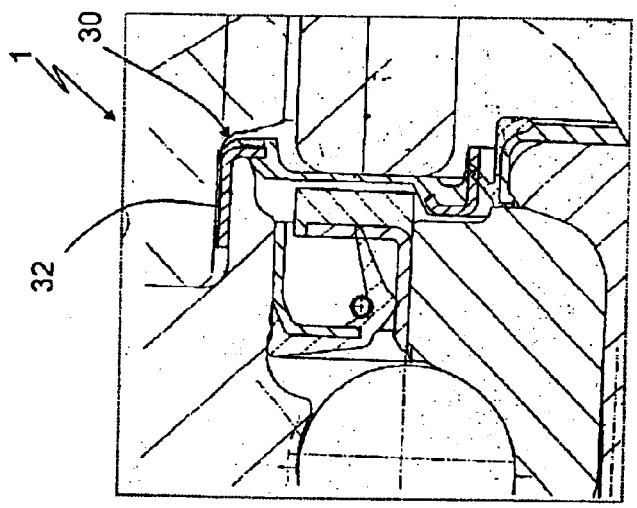
Figure 1:
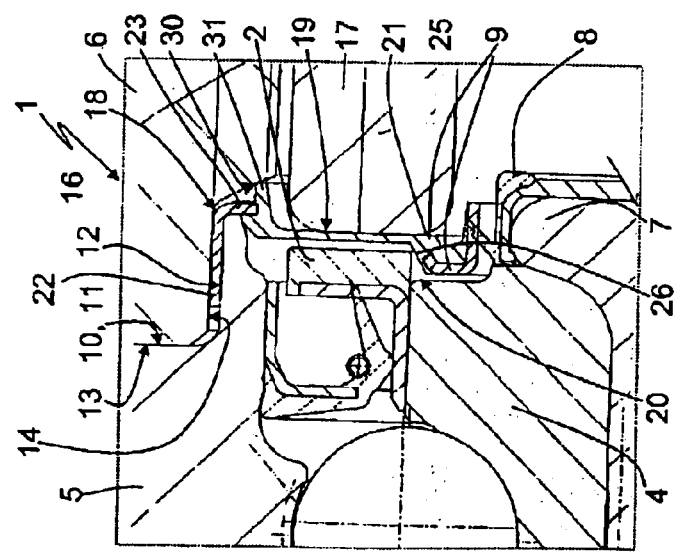

The present invention will now be described with reference to the attached drawings, which illustrate a non-limiting embodiment of the present invention in which:

FIG. 1 illustrates, with some parts in section and some parts removed for reasons of clarity, a first preferred embodiment of a protection device for an encoder in a rolling bearing produced according to the present invention; and FIGS. 2 and 3 illustrate a second preferred form of embodiment of the protection device which is illustrated in FIG. 1.

With reference to FIG. 1, the number 1 indicates in its entirety, a protection device for an encoder 2 in a rolling contact bearing 3.

The bearing 3 comprises an inner race 4 which rotates around a rotation axis A, and a fixed outer race which is arranged in direct contact against a fixed support 6. The inner race 4 is axially blocked by a TURNED UP ELEMENT 7, and it is provided with a sealing element 8, which is mounted onto the TURNED UP ELEMENT 6 itself, and which presents a conical lip 9 which is orientated in such a way that its own taper is towards the outside of the bearing 3. The outer race 5 is externally provided with an annular housing 10 which is axially delimited towards the inside by a surface 11 which is transverse to the axis A and which is radially delimited towards the inside by a cylindrical surface 12 which is co-axial to the axis A.

The support 6 presents a striker surface 13 which is transverse to the axis A and against which the surface 11 is arranged in direct contact, and an inner cylindrical surface 14 which faces the surface 12 and which is arranged at a determined radial distance from the surface 12 itself. The support 6 is also provided with an inner shoulder 15, which is axially delimited by the part which is turned towards the outer race 5 of a surface 16 in the form of a tapering cone, and which supports a reading sensor 17 which is aligned with the encoder 2.

The device 1 is interposed between the encoder 2 itself and the sensor 17, and it comprising a fixing race 18 which is shrink fit onto the surface 12, a protection shield 19 which extends from the fixing race 18 towards the inner race 4 of the bearing 3 in a position which is frontal to both the encoder 2 and the sensor 17, and a stiffening race 20 which is integrated into a radially inner portion 21 of the protection shield 19, and which is suitable for co-operating with the lip 9 in order to guarantee the sealing capacity of the radially inner part of the bearing 3.

The fixing race 18 is made of material which does not corrode, for example stainless steel, plastic or alloy, and it comprises a cylindrical wall 22 which is inserted between the surfaces 12 and 14 and which is in close contact with both, and an annular wall 23 which is interposed between an outer annular surface 254 of the outer race 5 and the surface 16 of the shoulder 15.

The stiffening race 20 comprises a respective annular wall 25 which faces the inner race 4 and which is completely buried inside the shield 19, and a respective cylindrical wall 26 which is arranged, in its radially internal part, in sliding contact with the lip 9.

Finally, the device 1 comprises a sealing element 30 which is integral to the fixing race 18 and which is directly interposed between the fixing race 18 and the support 6 in order to effect the static waterproofing of the support 6 itself.

In the form of embodiment which is illustrated in FIG. 1, the element 30 is defined by a rubber lip 31 which extends axially in an overlapping fashion from the annular wall 23 of the fixing race 18, and which is arranged in contact with the surface 16 of the shoulder 15. The lip 31 presents a substantially cylindrical shape and is squared by the part which is arranged in contact with the surface 16, while it is connected to the shield 19.

In the alternative form of embodiment which is illustrated in FIG. 2, the sealing element 30 is, instead, defined by an external covering 32 of the fixing race 18, and is substantially compressed between the cylindrical wall 22 of the fixing race 18 itself and the cylindrical surface 14 of the support 6.

The form of embodiment which is illustrated in FIG. 3 differs from the above description in that the radially internal portion 21 of the protection shield 19 does not present the stiffening race 20, but is defined by a rubber lip 33, which axially extends from the shield 19 towards the inner race 4 and which is arranged in sliding contact with the inner race 4 itself.

The lip 33 presents, in a transverse section containing the A axis, a shape which is substantially in the form of an arch, and which is arranged with its own free end border 34 substantially tangential to the inner race 4.

It is obvious from the above description that, with the sealing lip 31 or the covering 32 or the rubber lip 33, it is possible to produce a waterproofing for the support 6, and that it is especially possible to produce an axial waterproofing for the two lips 31 and 33, and a radial waterproofing for the covering 32.

It is intended that the present invention should not be limited to the forms of embodiment which are herein described and illustrated. Such forms of embodiment are to be considered as examples of forms of embodiment of a protection device for an encoder in a rolling bearing, which might be subject to further modifications in terms of the shape and disposition of its parts, as well as to details pertaining to construction and assembly.

What is the claimed is:

1. Protection device (1) for an encoder (2) in a rolling bearing (3) presenting an outer race (5) which is arranged in contact against a fixed support (6), the device (1) being interposed between the encoder (2) itself and a reading sensor (17) which is supported by the support (6) itself, and comprised a fixing race (18) which is shrink fit onto the outer race (5) of the bearing (3) and which is frontal to a shoulder (15) of the support (6), and a protection shield (19) which extends from the fixing race (18) towards an inner race (4) of the bearing (3) in a position which is frontal to both the encoder (2) and the sensor (17); the device (1) being characterised by the fact that it comprises a sealing element (30) which is integral to the fixing race (18) and which is interposed directly between the fixing race (18) and the support (6) in order to statically waterproof the support (6).

2. Protection device according to claim 1, characterised by the fact that the fixing race (18) comprises a cylindrical wall (22) which is inserted between an external cylindrical surface (12) of the outer race (5) of the bearing (3) and an internal cylindrical surface (14) of the support (6); the said sealing element (30) is defined by an external covering (32) of the fixing race (18), and is substantially compressed between the cylindrical wall (22) of the fixing race (18) itself and the internal cylindrical surface (14) of the support (6).

3. Protection device according to claim 1, characterised by the fact that the fixing race (18) comprises an annular wall (23) which is interposed between an external annular surface (24) of the outer race (5) of the bearing (3) and a frontal surface (16) of the shoulder (15) of the support (6); the said sealing element (3) being defined by a rubber lip (31) which extends axially overlapping the annular wall (23) of the fixing race (18), and being arranged in contact with the frontal surface (16) if the shoulder (15).

4. Protection device according to claim 2 or 3, characterised by the fact of comprising a further rubber lip (33), which defines an inner radial portion (21) of the protection shield (19), and which is arranged in sliding contact with the inner race (4) of the bearing (3).

5. Protection device according to claim 2 or 3, characterised by the fact of comprising a stiffening race (20), which is integrated into a radially internal portion (21) of the protection shield (19), and which is suitable for co-operating with further sealing devices (9) which are mounted onto the bearing (3) in order to guarantee a sealing action in the radially internal part of the bearing (3) itself.

6. Protection device according to claim 5, characterised by the fact that the said stiffening race (20) comprises a respective annular wall (25) which faces the inner race (4) of the bearing (3) and a respective cylindrical wall (26) which is arranged in contact with an additional sealing element (9) which is integral to the inner race (4).

7. Protection device according to claim 1, characterised by the fact that the said fixing race (18) is made of material which does not corrode.

* * * * *